(12) United States Patent
Hioki et al.

(10) Patent No.: US 7,167,772 B2
(45) Date of Patent: Jan. 23, 2007

(54) MACHINING TIME CALCULATING APPARATUS

(75) Inventors: Katsuya Hioki, Aichi (JP); Takahiro Yamaguchi, Aichi (JP)

(73) Assignee: Okuma Corporation, Aichi (JP)

( * ) Notice: Subject to any disclaimer, the term of this patent is extended or adjusted under 35 U.S.C. 154(b) by 0 days.

(21) Appl. No.: 11/101,350

(22) Filed: Apr. 7, 2005

(65) Prior Publication Data

US 2005/0228533 A1    Oct. 13, 2005

(30) Foreign Application Priority Data

Apr. 7, 2004    (JP) .............................. 2004-113410

(51) Int. Cl.
| | |
|---|---|
| G06F 19/00 | (2006.01) |
| G05B 11/01 | (2006.01) |
| G05B 19/42 | (2006.01) |
| G05B 19/18 | (2006.01) |
| G05B 19/25 | (2006.01) |
| G04F 10/00 | (2006.01) |

(52) U.S. Cl. ..................... 700/189; 700/184; 700/188; 700/14; 700/86; 702/176; 318/568.1; 318/573

(58) Field of Classification Search .................. 700/13, 700/14, 56, 61, 62, 64, 86, 159, 169, 180–191, 700/193, 194; 318/562, 567, 569–574, 568.1, 318/600, 625; 702/176–178

See application file for complete search history.

(56) References Cited

U.S. PATENT DOCUMENTS

| | | | |
|---|---|---|---|
| 4,550,375 A * | 10/1985 | Sato et al. .................. 700/169 |
| 5,197,014 A * | 3/1993 | Seki et al. .................. 700/189 |
| 5,221,884 A * | 6/1993 | Teshima ..................... 318/569 |
| 5,303,333 A * | 4/1994 | Hoos .......................... 700/245 |
| 5,611,032 A * | 3/1997 | Matsuura et al. ........... 700/182 |
| 5,815,401 A * | 9/1998 | Otsuki et al. ............... 700/189 |
| 6,401,004 B1 * | 6/2002 | Yamazaki et al. .......... 700/159 |
| 6,477,441 B1 * | 11/2002 | Sagasaki ..................... 700/160 |
| 6,728,657 B1 * | 4/2004 | Nakamura ................... 702/178 |
| 7,027,889 B1 * | 4/2006 | Nakamura ................... 700/181 |
| 2005/0209712 A1 * | 9/2005 | Sagasaki et al. .............. 700/28 |

FOREIGN PATENT DOCUMENTS

| | | | |
|---|---|---|---|
| JP | 04100124 A | * | 4/1992 |
| JP | 04307606 A | * | 10/1992 |
| JP | 05050358 A | * | 3/1993 |
| JP | 05146945 A | * | 6/1993 |
| JP | 2003175439 |   | 6/2003 |

* cited by examiner

Primary Examiner—Crystal J. Barnes
(74) Attorney, Agent, or Firm—Gauthier & Connors LLP

(57) ABSTRACT

A structure having a parameter storing unit which stores a parameter to be used when a numeric control apparatus drives and controls the numeric control machine tool, a program interpretation unit which reads a part program to generate machining data for each block, an interpolation unit which interpolates a movement path instructed in an axis moving instruction referring to a parameter stored in the parameter storing unit and using an interpolation algorithm which is identical to a driving and controlling interpolation algorithm of the numeric control apparatus, an interpolation count counting unit which counts an interpolation count in the movement path, and an axis moving time calculating unit which multiplies an interpolation cycle when the numeric control apparatus drives and controls the numeric control machine tool and the counted interpolation count to calculate an axis moving time.

4 Claims, 8 Drawing Sheets

```
N1   M03  S100
N2   G00  X0  Y0
N3   G01  X100                F100
N4   G03  X0  Y100  I-100     F90
N5   G01  Y0                  F100
N6   M02
```

MACHINING TIME CALCULATING APPARATUS

BACKGROUND OF THE INVENTION

1. Field of the Invention

The present invention relates to an apparatus for calculating the time required for machining using an NC (Numeric Control) machine tool, and in particular to an apparatus for calculating an axis moving time when the numeric control apparatus itself has an algorithm for adjusting the feeding velocity or the like for achieving an optimum machining process.

2. Description of the Related Art

When a production schedule or the like is made, a schedule is established based on the required time for each production process and in consideration of operation state of the production equipment and load of an operator so that the schedule is effective and waste in resources is minimized. The required time for each production process is estimated by collecting past performance and from experience.

The required time for a machining step using the NC machine tool depends to a great extent on a part program. In a part program generated by a CAM (Computer Aided Manufacturing system), the CAM has a unit for calculating the machining time, and, typically, the machining time is output along with the part program. In addition, an apparatus is known in which a machining time estimating unit is provided in a numeric control apparatus which drives and controls an NC machine tool and in which the machining time is calculated based on the input part program. The apparatus for calculating machining time in these apparatuses calculates an axis moving time by dividing an axis moving distance, which is a relative movement distance between the tool and the part, by an axis feeding velocity.

FIG. 3 exemplifies a numeric control apparatus in which a unit for calculating a machining time is provided. The numeric control apparatus comprises an actual machining time calculating unit 121 which calculates an actual machining time of a driving mechanism 102 related to an auxiliary function which is a function other than the axis moving function and updates data stored in a database 122 using the calculated actual machining time. An NC program stored in a program storing unit 111 is analyzed block by block and an estimated axis moving time is calculated based on the analysis result. The numeric control apparatus also searches through the database 122 to obtain an actual machining time of a corresponding auxiliary function. A machining time estimating unit 124 is provided for calculating a machining time for each block based on the obtained estimated axis moving time and the actual machining time of auxiliary function and calculating an estimated machining time by adding these. In this structure, the estimated axis moving time is calculated based on an axis moving distance and an axis feeding velocity which are determined from an axis moving instruction, in consideration of an acceleration/deceleration rate of the axis movement stored in a parameter storing unit 114.

The actual machining time calculating unit 121 of the numeric control apparatus calculates an actual machining time of axis movement based on a control signal output from a program analysis unit 112 and an operation completion signal from the driving mechanism 102. It is also possible to calculate the machining time for each block based on the obtained actual machining time of the axis movement and the obtained actual machining time of the auxiliary function and then, adding the machining times to calculate an actual machining time (refer to, for example, Japanese Patent Laid-Open Publication No. 2003-175439).

A structure of a numeric control apparatus which drives and controls a typical NC machine tool will be described referring to FIG. 4 focusing on the axis movement operation.

A part program 1 instructs a machine operation in units of blocks and comprises an axis moving instruction for relatively moving the tool and the part and an auxiliary function instruction for functions other than the axis movement such as a rotation instruction of the spindle and a tool exchange instruction. An NC parameter storing unit 4 stores NC parameters which are necessary information of the machines, for the numeric control apparatus to drive and control the NC machine tool based on the part program, such as, for example, a value of a work coordinate origin with respect to a machine coordinate origin, a tool length and a tool radius for tool offset, and a maximum feed velocity and allowed acceleration of a machine. The maximum feed velocity and allowed acceleration of a machine are set in advance by the machine tool maker and the value such as the work coordinate origin, tool length, and tool radius are set to suitable values by an operator of the machine using an NC parameter setting unit 3 before the program is run.

A program interpreting unit 12 reads the part program 1, sequentially interprets instructions block by block, and generates machining data for each block. The generated machining data is stored in an execution data buffer 15. In this process, the NC parameters stored in the NC parameter storing unit 4 are referred as necessary.

An interpolation unit 16 has functions as follows. First, the interpolation unit 16 sequentially reads part data stored in the execution data buffer 15 in units of blocks and determines whether or not the read part data is an axis moving instruction. When the read part data is an axis moving instruction, the interpolation unit 16 sequentially determines the position of a tool on the part with respect to the shape instructed corresponding to the block. In other words, the interpolation unit 16 sequentially interpolates a relative movement path of the tool with respect to the part so that the tool moves on the part at the instructed feeding velocity to determine interpolation points as the position of the tool on the part. The timing for determining the interpolation points is synchronized with a synchronization signal which is output in a predetermined period (interpolation cycle, hereinafter referred to as "control period") from a synchronization unit 19. The control period required during determination of the interpolation points refers to the NC parameter stored in the NC parameter storing unit 4. In addition, the interpolation unit 16 determines a difference between the determined interpolation point and an interpolation point determined at a previous control period and outputs the difference to a servo control unit 17 as an incremental movement instruction. The servo control unit 17 applies a servo control to a motor 18 based on the incremental movement instruction in synchronization with the synchronization signal output from the synchronization unit 19 at every control period to drive a feeding axis of the machine tool (not shown) according to the axis moving instruction.

Various interpolation algorithms for interpolating, in each control period, the movement path instructed by the axis moving instruction are available depending on the target NC machine tool and numeric control apparatus. Therefore, the axis moving times also significantly differ from each other depending on the interpolation algorithm.

For example, a case is considered in which a sector-shaped part as shown in FIG. 5A is machined with a part program shown in FIG. 5B and a movement path of Pa→Pb→Pc→Pa.

A basic interpolation algorithm is a method in which the tool is accelerated with a set acceleration time constant from a movement starting point for each block to a designated feed velocity, the tool is moved at a constant feed velocity, and the tool is decelerated at a set deceleration time constant from a point before a movement completion point. FIG. 6 shows a feed velocity when a sector-shaped part of FIG. 5A is to be machined by a numeric control apparatus having such an interpolation algorithm. The axis moving time of the numeric control apparatus using such an algorithm can be determined from an axis moving distance, an axis feeding velocity, and the acceleration/deceleration time constant for each block. Therefore, when the basic interpolation algorithm is employed, it is possible to accurately calculate the axis moving time even with the machining time calculating apparatus of the related art.

However, advanced numeric control apparatuses which are recently developed often have a function for optimally adjusting the feeding velocity and the acceleration/deceleration in order to improve the machining precision and quality. FIG. 7 shows an example feed velocity when the sector-shaped part of FIG. 5A is to be machined by a numeric control apparatus having an interpolation algorithm corresponding to such a configuration. In the interpolation algorithm in this numeric control apparatus, when the relative movement direction of the tool and the part changes, the feeding velocity is optimally adjusted according to the amount of change. In the illustrated example structure, the feeding velocity is reduced to an optimal feeding velocity v1 compared to the case when the basic interpolation algorithm is used at the machining points Pb and Pc wherein the movement direction is drastically changed as shown in FIG. 5A, according to an mount of change in the feeding velocity and movement direction before and after the point of the drastic change. In addition, because the movement direction continuously changes at the arc section, the feeding velocity is reduced compared to the case in which the basic interpolation algorithm is used based on the radius of curvature.

In a machining time calculating apparatus of the related art which estimates the axis moving time using the basic interpolation algorithm solely from the axis moving distance, axis feeding velocity, and acceleration/deceleration time constants, the axis moving time cannot be accurately calculated in the above-described configuration. That is, it is not possible to accurately calculate the axis moving time in a machining process by a numeric control apparatus having the interpolation algorithm to automatically adjust the feeding velocity and acceleration/deceleration. For example, in a machining operation, such as the machining of a mold in which the axis moving time occupies a large proportion of the time compared to the time when the auxiliary function is executed, a large difference between an estimated machining time and the actual machining time will result from an error in calculating the axis moving time, creating a significant problem in production scheduling or order fulfillment. Thus, there had been a problem in that the obtained estimate cannot be used for production scheduling without further processing.

In such a configuration, an operator corrects the calculated machining time from his experience and uses the corrected machining time. However, in the numeric control apparatus, the feeding velocity and the acceleration/deceleration are often continuously optimally adjusted based on various factors such as a shape instructed by the part program, a degree of approximation of the shape, an upper limit of feeding velocity with respect to the axis movement, and allowed acceleration of the axis movement. The axis moving time may significantly vary even when one factor is slightly changed, and, thus, it has been difficult to use the experience and to accurately correct the calculated machining time.

There is another method of using an actual machining time of the axis movement determined as a function of the actual machining time outputting unit in the related art. However, in this method, it is necessary to actually operate the NC machine tool using the target part program, and thus, in a machining process such as a mold machining which requires few hours to few tens of hours, this time is required for estimating the machining time. Moreover, because the NC machine tool cannot be used during this period for other purposes, such as the actual machining and preparation of machining, this method is impractical. In addition, this method requires that an actual machining time calculating unit be directly connected to the NC machine tool, and, therefore, this method is not suited for a system in which a required time for each production process is calculated and a production schedule is established based on the calculated time.

SUMMARY OF THE INVENTION

The present invention was made in consideration of the above-described problem, and advantageously provides a machining time calculating apparatus which can quickly and accurately calculate the machining time, particularly the axis moving time, even in a machining process using a numeric control apparatus having a function to optimally adjust the feeding velocity and acceleration/deceleration.

According to one aspect of the present invention, there is provided a machining time calculating apparatus which calculates a machining time when an NC machine tool is driven and controlled based on a part program to machine a part, comprising a parameter storing unit which stores a parameter to be used when a numeric control apparatus drives and controls the NC machine tool; a program interpretation unit which reads and interprets the part program to generate machining data for each block; an interpolation unit which determines whether or not the machining data for a block is an axis moving instruction, and, when the machining data is an axis moving instruction, interpolates a movement path instructed in the axis moving instruction referring to a parameter stored in the parameter storing unit and using an interpolation algorithm which is identical to a driving and controlling interpolation algorithm of the numeric control apparatus; an interpolation count counting unit which counts an interpolation count in the movement path instructed by the axis moving instruction; and an axis moving time calculating unit which multiplies an interpolation cycle when the numeric control apparatus drives and controls the NC machine tool and the counted interpolation count to calculate an axis moving time of the axis moving instruction.

According to another aspect of the present invention, it is preferable that, in the machining time calculating apparatus, the parameter storing unit selects a desired parameter from among a plurality of parameters which are stored corresponding to a plurality of the numeric control apparatuses.

According to another aspect of the present invention, it is preferable that, in the machining time calculating apparatus, the interpolation unit selects a desired driving and controlling interpolation algorithm from among a plurality of driving and controlling interpolation algorithms which are stored corresponding to a plurality of the numeric control apparatuses.

With an apparatus according to a first aspect of the present invention, it is possible to accurately calculate the axis moving time even in a machining process which uses a numeric control apparatus having a function to optimally adjust the feeding velocity and acceleration/deceleration. Therefore, by establishing a production schedule using the axis moving time calculated by the machining time calculating apparatus of the present invention, it is possible to more effectively produce machined products without waste.

For example, in a mold machining process in which experience is of little benefit for improving the precision of estimation of the machining time because machining times vary between a few hours to a few tens of hours and the proportion of the axis moving time is very high, the present invention can provide a great advantage. In addition, because the NC machine tool need not be actually operated and the machining time can be quickly estimated, it is not necessary to use an expensive NC machine tool for estimating the machining time, making it possible to instead efficiently and effectively use the NC machine tool for its intended, profitable use of machining.

In an apparatus according to a further aspect of the present invention, an NC parameter such as an upper limit of the feeding velocity and the allowed acceleration of a machine which is used when a numeric control apparatus drives and controls an NC machine tool is stored for each numeric control apparatus and a desired NC parameter is selected. With this structure, it is possible to accurately calculate the axis moving time, even when the numeric control apparatus controls a plurality of NC machine tools having different properties and even when the different types of numeric control apparatuses are employed.

According to the apparatus of the third aspect of the present invention, various interpolation algorithms are stored corresponding to the numeric control apparatus and an interpolation algorithm for which the machining time calculation is desired is selected. With this structure, it is possible to accurately calculate the axis moving time even in a numeric control apparatus which uses a different interpolation algorithm.

BRIEF DESCRIPTION OF THE DRAWINGS

Preferred embodiments of the present invention will be described in detail based on the following figures, wherein.

DESCRIPTION OF PREFERRED EMBODIMENTS

Figure 1:
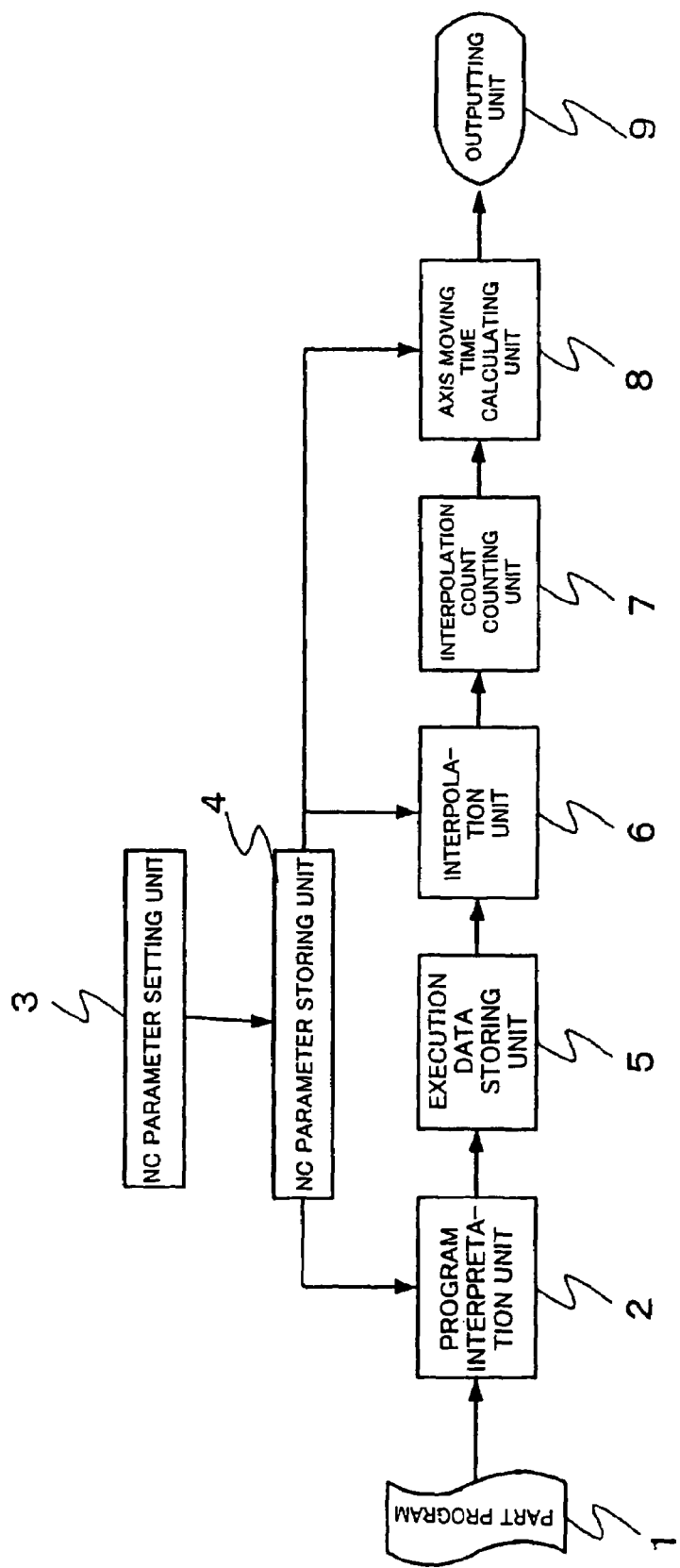
FIG. 1 is a block diagram showing a structure according to a first preferred embodiment of the present invention.

A first preferred embodiment will now be described referring to FIG. 1 and an example axis moving operation. A part program 1, an NC parameter setting unit 3, and an NC parameter storing unit 4 are identical to those described with respect to the numeric control apparatus of the related art and will not described again.

A program interpretation unit 2 reads the part program 1 which is a target for which the machining time is to be calculated, sequentially interprets the part program 1 for each block, generates machining data for each block, and stores the machining data in an execution data storing unit 5. In this process, the program interpretation unit 2 refers to an NC parameter such as a unit system of program instruction and tool radius stored in the NC parameter storing unit 4. The machining data for each block which is generated is data similar to the machining data for each block explained with respect to the numeric control apparatus of the related art.

An interpolation unit 6 sequentially reads the machining data for each block stored in the execution data storing unit 5 and determines whether or not the read machining data is an axis moving instruction. When the read machining data is an auxiliary function instruction of a function other than the axis movement, the interpolation unit 6 calculates an auxiliary function operation time through a known method.

Figure 8:
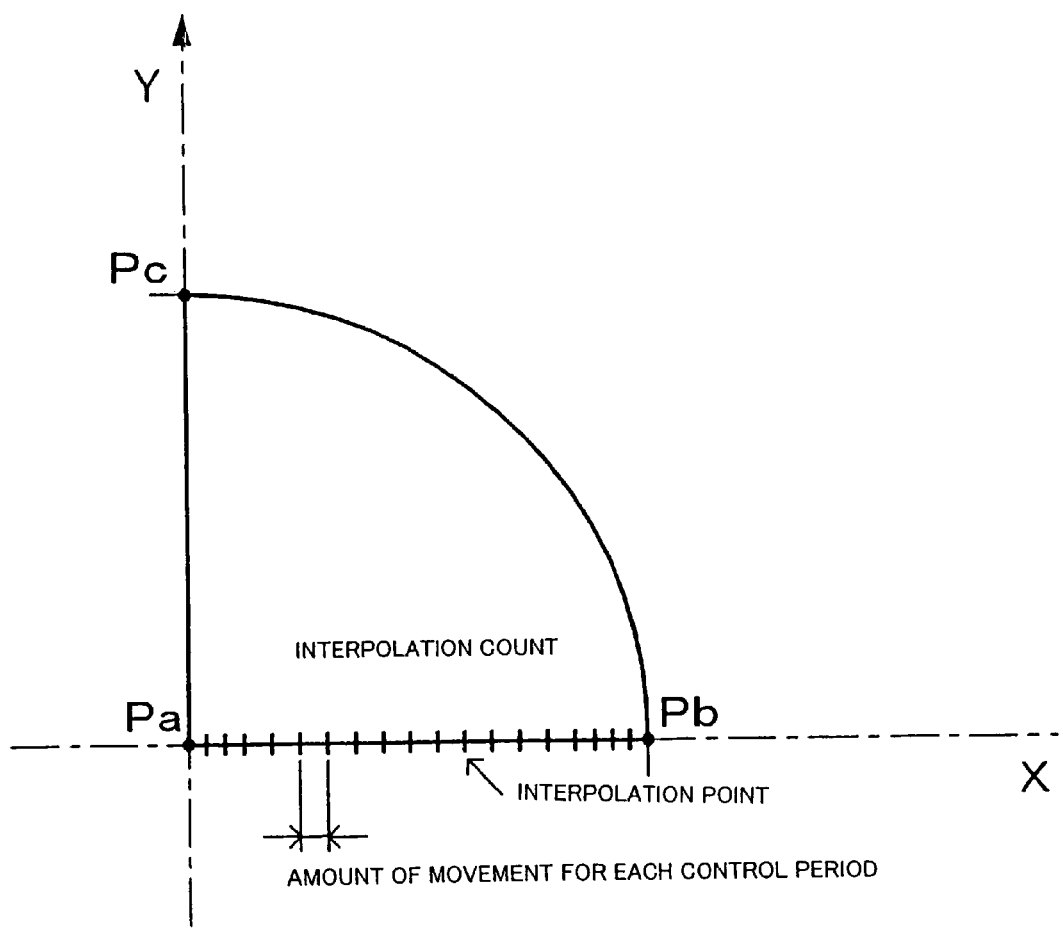
FIG. 8 is a diagram for explaining an interpolation method of a movement path.

When the read machining data is an axis moving instruction, positions of the tool on the part with respect to the shape instructed in the block are sequentially determined using an interpolation method. Specifically, an amount of axis movement for each control period is calculated, based on an interpolation algorithm identical to the interpolation algorithm of the numeric control apparatus for which the machining time is to be calculated, so that the tool moves on the part at an optimal feeding velocity, and the relative movement path of the tool with respect to the part is sequentially interpolated, and then interpolation points are determined as the positions of the tool on the part (FIG. 8).

For example, when the target numeric control apparatus is an apparatus which optimally adjusts the feeding velocity corresponding to an amount of change when the relative movement direction between the tool and the part changes, the interpolation unit 6 calculates an amount of change of the movement direction between a plurality of blocks or within a specific block using an interpolation algorithm which is identical to that of the numeric control apparatus. Based on the amount of change of the movement direction, the axis feeding velocity may be reduced to an optimal feeding velocity v1 or the axis feeding velocity may be reduced from the feeding velocity originally designated in the part program according to the change of the movement direction between previous and next interpolation points that are sequentially determined. In this process, the interpolation unit 6 determines, referring to the NC parameter stored in the NC parameter storing unit 4, the degree of reduction of the feeding velocity corresponding to the change in the movement direction.

Each time the interpolation unit 6 determines an interpolation point, the interpolation unit 6 outputs an interpolation point calculation signal to an interpolation count counting unit 7. Then, using the axis feeding velocity, the interpolation unit 6 calculates an amount of axis movement for each control period and determines a position of the next interpolation point.

The interpolation unit 6 sequentially determines an interpolation point using an interpolation algorithm similar to the interpolation algorithm of the numeric control apparatus. When the interpolation is completed for a final point of the shape instructed in the machining data for each block, the interpolation unit 6 outputs an interpolation point calculation completion signal to the interpolation count counting unit 7.

The interpolation count counting unit 7 counts the interpolation point calculation signal transmitted from the interpolation unit 6 by addition and outputs the count determined by counting through addition to an axis moving time calculating unit 8 as a count of all interpolations for that block when the interpolation point calculation completion signal is transmitted.

The axis moving time calculating unit 8 calculates the axis moving time of the block by multiplying the count of all interpolations for the block transmitted from the interpolation count counting unit 7 and the interpolation cycle stored in the NC parameter storing unit 4.

In this manner, the calculation of the auxiliary function operation time and the axis moving time for each block is repeated until the final block of the part program. Then, the calculation time for the target block is accumulated so that a machining time when the NC machine tool is driven and controlled by the part program is calculated. The calculated accurate machining time is output to an output unit 9, such as a CRT and a printer, and is used for creating a production schedule or the like.

The execution data storing unit 5 may be constructed to store the machining data for all blocks of the part program 1, or, alternatively, the execution data storing unit 5 may be constructed to store the machining data for a necessary number of blocks.

It is also possible for the interpolation unit 6 to directly read machining data for each block interpreted by the program interpretation unit 2 and calculate the machining time based on the read data, instead of storing the read machining data for each block in the execution data storing unit 5.

Figure 2:
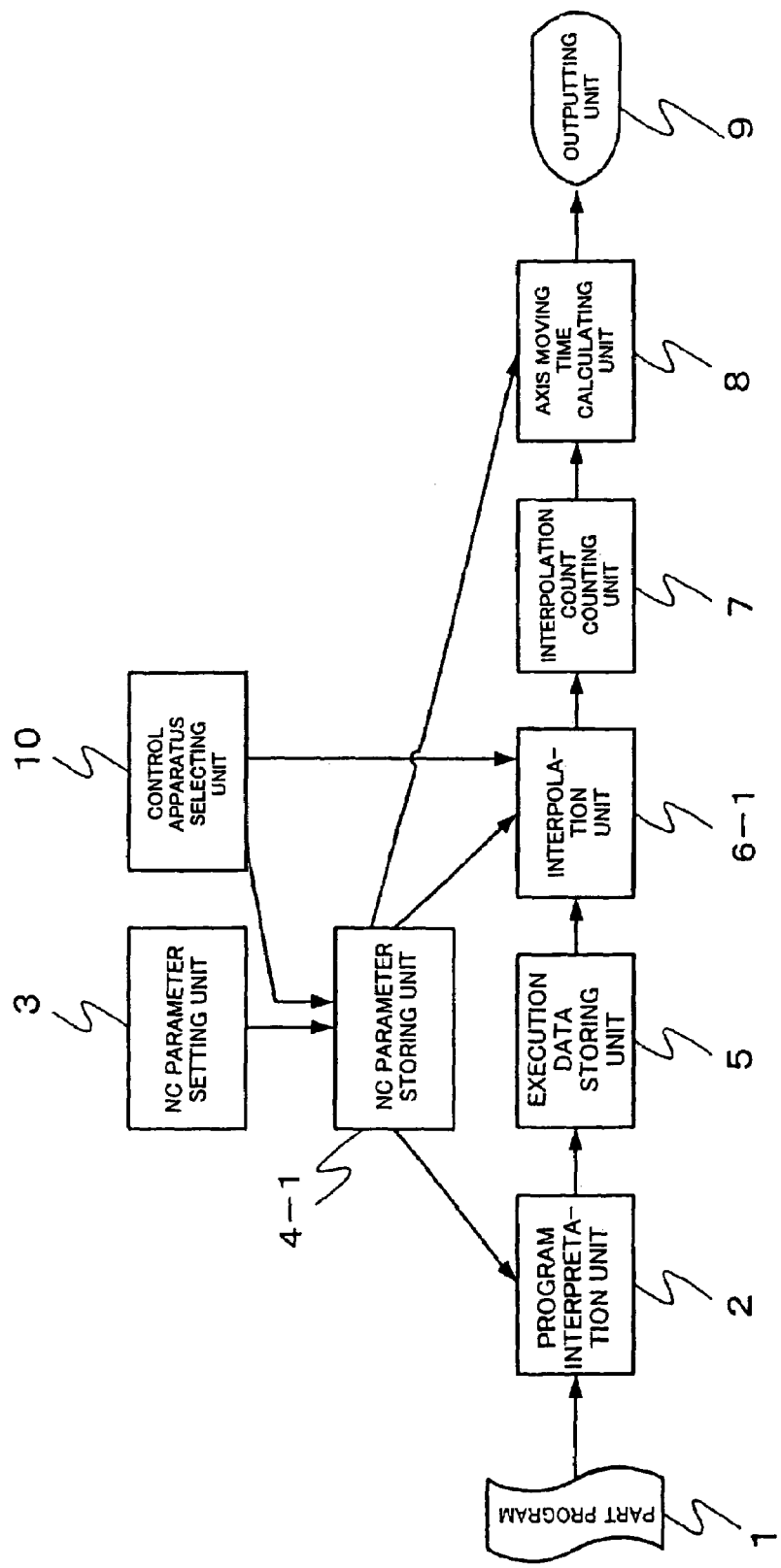
FIG. 2 is a block diagram showing a structure according to a second preferred embodiment of the present invention.
Figure 3:
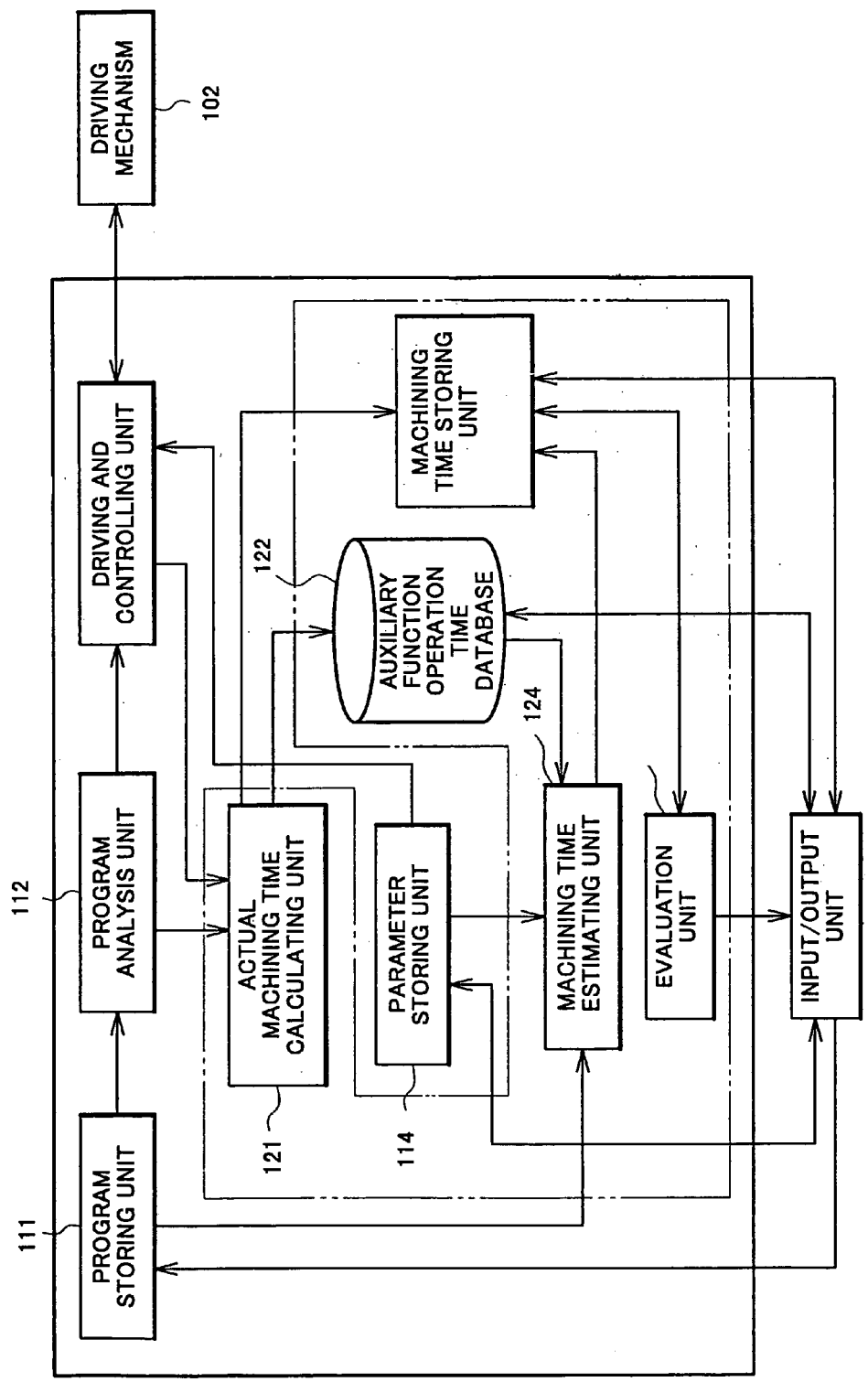
FIG. 3 is a block diagram showing a structure according to related art.
Figure 4:
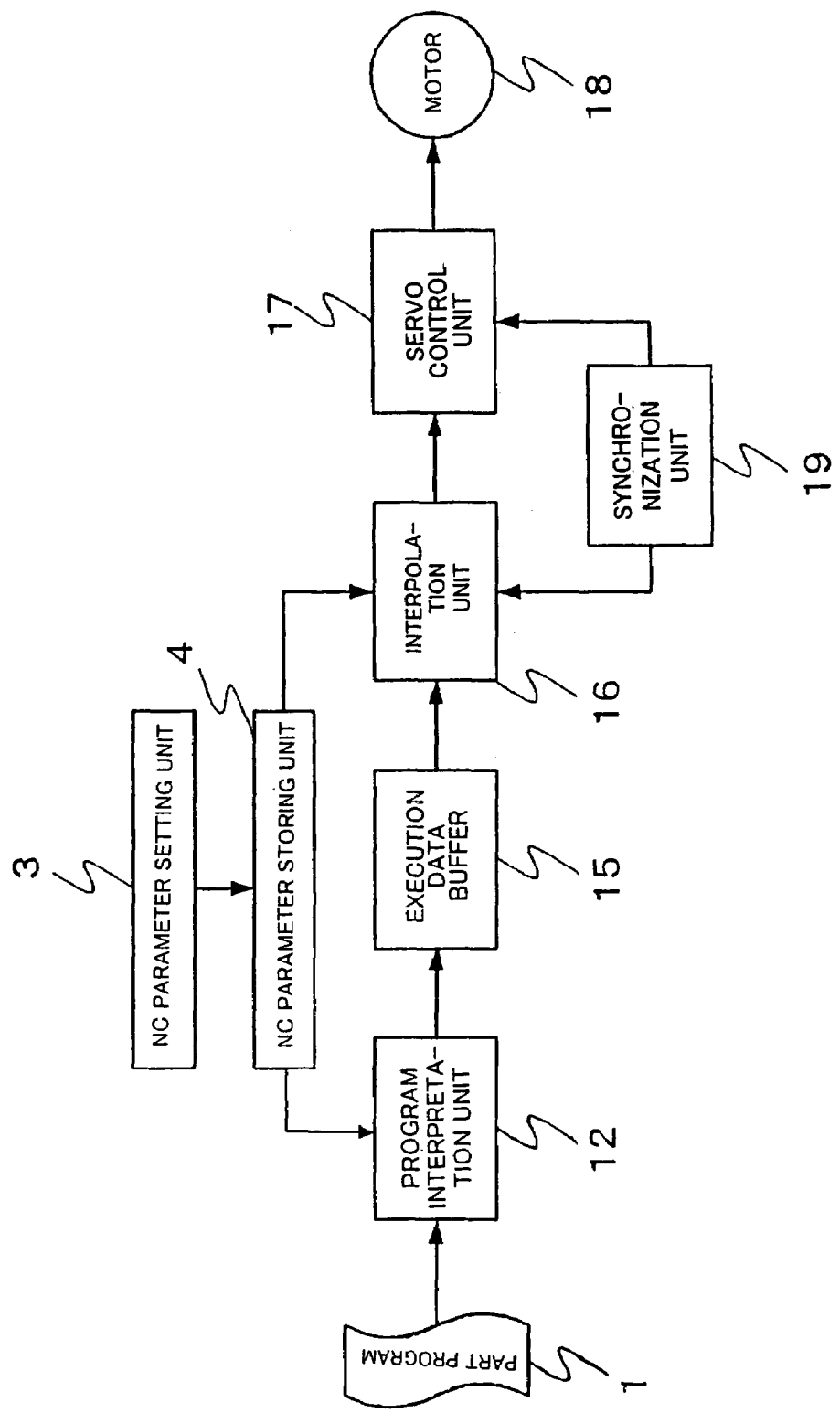
FIG. 4 is a block diagram showing a structure of an NC machine tool.
Figures 5A, 5B:
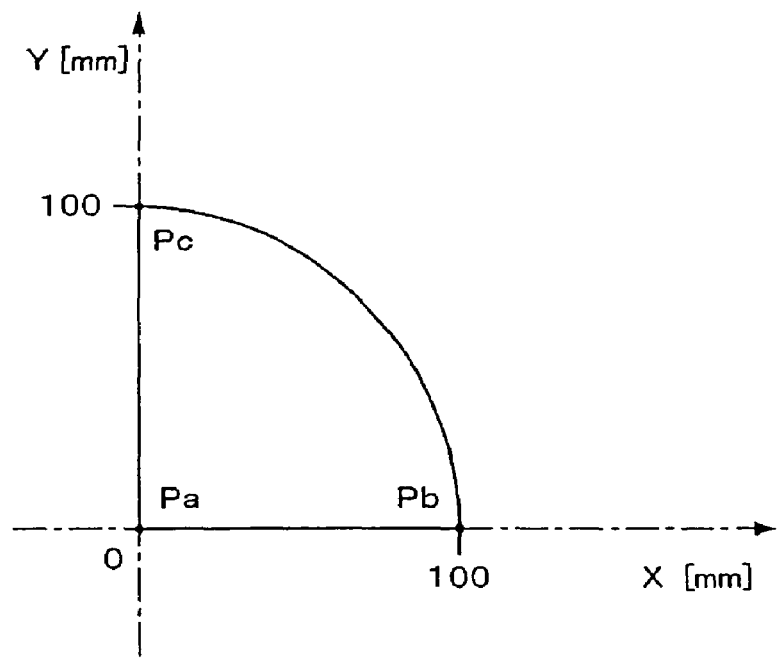
FIG. 5A is a diagram exemplifying an example shape in a cutting machining process.
FIG. 5B is a diagram exemplifying an example part program corresponding to the example shape in a cutting machining process.
Figure 6:
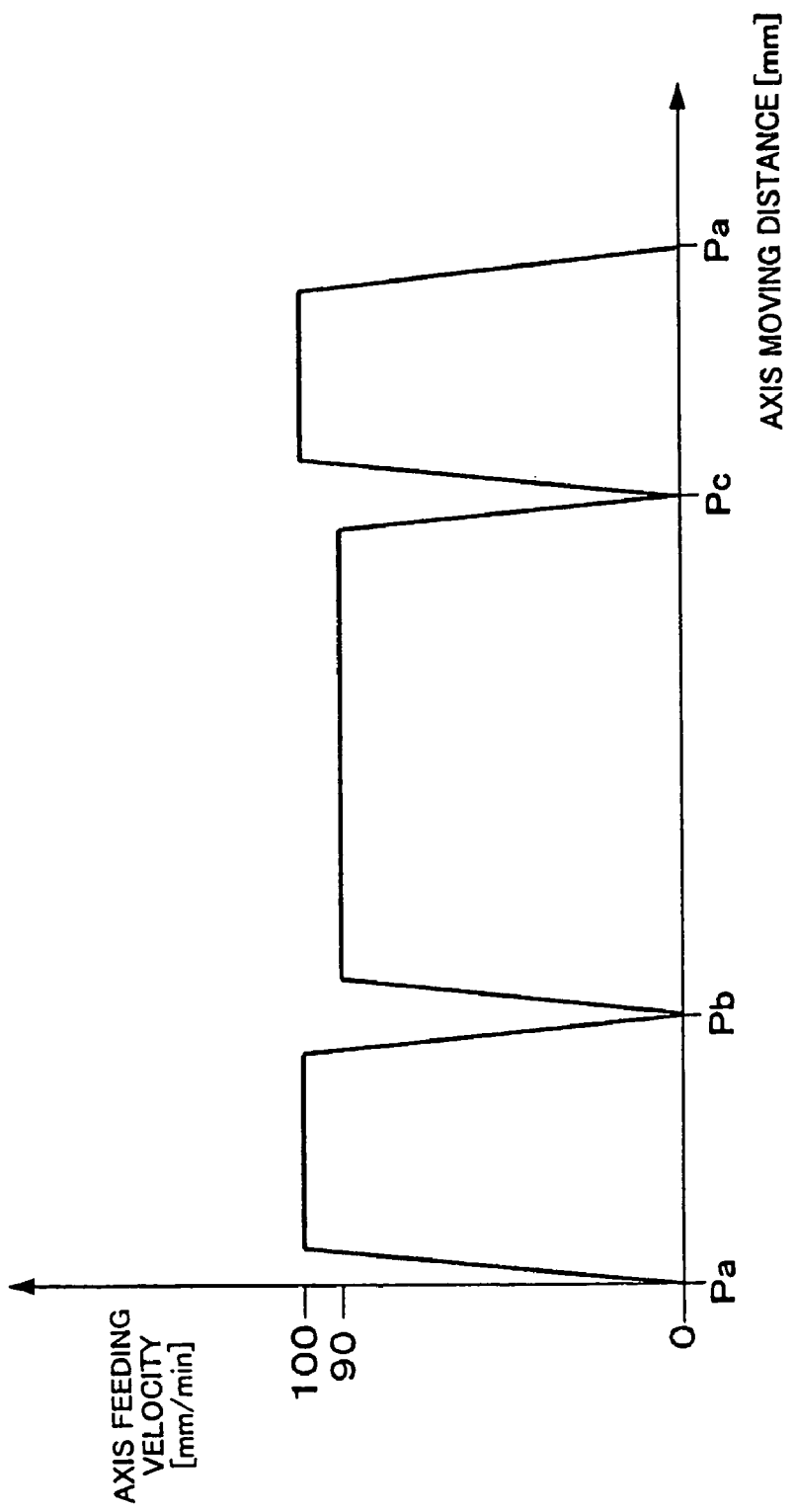
FIG. 6 is a diagram showing an example feeding velocity when the shape of FIG. 5A is machined.
Figure 7:
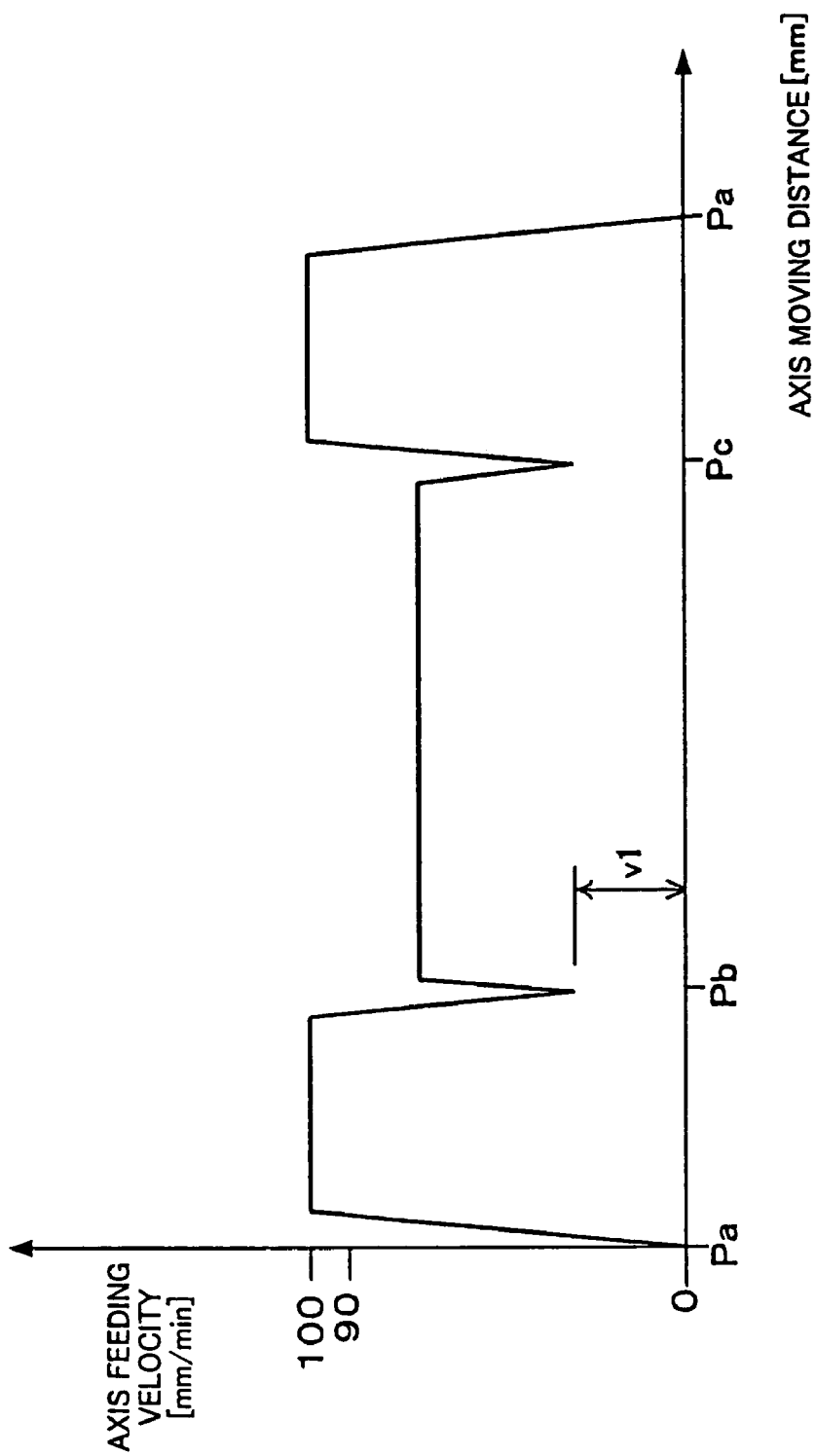
FIG. 7 is a diagram showing another example feeding velocity when the shape of FIG. 5A is machined.

A second preferred embodiment of the present invention will now be described referring to FIG. 2.

The NC parameter is data which is used when the numeric control apparatus drives and controls an NC machine tool, and different values of the NC parameters are used for different types of the NC machine tools to be controlled and for different types of the numeric control apparatuses. In order to allow calculation of an axis moving time of NC machine tools or numeric control apparatuses of different types, an NC parameter storing unit 4-1 in the second preferred embodiment of the present invention stores a plurality of types of NC parameters.

In addition, an interpolation unit 6-1 stores a plurality of types of interpolation algorithms to allow calculation of the axis moving time of a plurality of numeric control apparatus having different interpolation algorithms.

A control apparatus selection unit 10 selects an NC parameter corresponding to the numeric control apparatus for which the machining time is to be calculated from among the plurality of NC parameters stored in the NC parameter storing unit 4-1. Alternatively, the control apparatus selection unit 10 selects an interpolation algorithm corresponding to the numeric control apparatus for which a machining time is to be calculated from among the plurality of interpolation algorithms stored in the interpolation unit 6-1.

When the machining time is to be calculated, the operator inputs, to the control apparatus selection unit 10 and corresponding to the part program 1, a name of the numeric control apparatus for which the machining time is to be calculated, to select a desired NC parameter and a desired interpolation algorithm. Then, similarly as in the first preferred embodiment of the present invention, the interpolation unit 6-1 interpolates the shape instructed by the part program based on the part program 1 read by the program interpretation unit 2 and using the interpolation algorithm and the NC parameter selected by the control apparatus selection unit 10, and the axis moving time calculating unit 8 calculates the axis moving time.

What is claimed is:

1. A machining time calculating apparatus which calculates a machining time when a numerical control apparatus having an interpolation algorithm for adjusting a feed velocity and an acceleration/decleration executes a part program and drives a numeric control machine tool is driven and controlled based on a part program to machine a part, the machining time calculating apparatus comprising:

a parameter storing unit which stores a parameter to be used when a numeric control apparatus drives and controls the numeric control machine tool;

a program interpretation unit which reads and interprets the part program to generate machining data for each block;

an interpolation unit which determines whether or not the machining data for a block is an axis moving instruction and, when the machining data is an axis moving instruction, interpolates a shape instructed in the block by sequentially calculating an amount of axis movement and determining an interpolating point for each control period referring to a parameter stored in the parameter storing unit and using an interpolation algorithm which is identical to a driving and controlling interpolation algorithm of the numeric control apparatus;

an interpolation count counting unit which counts an interpolation calculation count for each block instructed by the axis moving instruction; and an axis moving time calculating unit which multiplies an interpolation cycle when the numeric control apparatus drives and controls the numeric control machine tool and the counted interpolation count to calculate an axis moving time of the axis moving instruction.

2. A machining time calculating apparatus according to claim 1, wherein the parameter storing unit selects a desired parameter from among a plurality of parameters which are stored corresponding to a plurality of the numeric control apparatuses.

3. A machining time calculating apparatus according to claim 1, wherein the interpolation unit selects a desired driving and controlling interpolation algorithm from among a plurality of driving and controlling interpolation algorithms which are stored corresponding to a plurality of the numeric control apparatuses.

4. A machining time calculating apparatus according to claim 2, wherein the interpolation unit selects a desired driving and controlling interpolation algorithm from among a plurality of driving and controlling interpolation algorithms which are stored corresponding to a plurality of the numeric control apparatuses.

* * * * *